United States Patent
Peng et al.

(10) Patent No.: US 8,286,932 B2
(45) Date of Patent: Oct. 16, 2012

(54) MOUNTING APPARATUS FOR STORAGE DEVICE

(75) Inventors: Wen-Tang Peng, Taipei Hsien (TW); Xin-Hu Gong, Shenzhen (CN); Gao-Liang Xia, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 276 days.

(21) Appl. No.: 12/780,952

(22) Filed: May 17, 2010

(65) Prior Publication Data

US 2011/0210220 A1 Sep. 1, 2011

(30) Foreign Application Priority Data

Feb. 26, 2010 (CN) .......................... 2010 1 0114974

(51) Int. Cl.
*F16M 11/00* (2006.01)
(52) U.S. Cl. .................................. 248/694; 361/679.34
(58) Field of Classification Search .................. 248/682, 248/638, 694, 346.01; 361/679.34, 679.35, 361/679.36
See application file for complete search history.

(56) References Cited

U.S. PATENT DOCUMENTS

| | | | | |
|---|---|---|---|---|
| 5,197,707 A | * | 3/1993 | Kohan ........................ | 248/638 |
| 6,088,222 A | * | 7/2000 | Schmitt et al. ............ | 361/679.33 |
| 6,233,143 B1 | * | 5/2001 | Gamble et al. ............ | 361/679.34 |
| 6,498,723 B1 | * | 12/2002 | Konshak et al. .......... | 361/679.34 |
| 7,697,276 B2 | * | 4/2010 | Peng et al. ................ | 361/679.33 |
| 2005/0135000 A1 | * | 6/2005 | Kao et al. .................. | 360/97.01 |
| 2006/0133030 A1 | * | 6/2006 | Takahashi et al. ........ | 361/685 |
| 2008/0128579 A1 | * | 6/2008 | Chen et al. ................ | 248/694 |
| 2009/0073649 A1 | * | 3/2009 | Ikeda et al. ............... | 361/679.35 |
| 2009/0195976 A1 | * | 8/2009 | Chang ........................ | 361/679.34 |
| 2010/0165564 A1 | * | 7/2010 | Lu .............................. | 361/679.35 |
| 2011/0085293 A1 | * | 4/2011 | Muramatsu ............... | 361/679.34 |
| 2012/0012730 A1 | * | 1/2012 | Marlow et al. ............ | 248/636 |

FOREIGN PATENT DOCUMENTS

CN 1402102 A 3/2003

* cited by examiner

Primary Examiner — Ramon Ramirez
(74) Attorney, Agent, or Firm — Altis Law Group, Inc.

(57) ABSTRACT

A mounting apparatus includes a frame to receive a storage device and a cushion fixed to a rear end of the frame. A number of protrusions extend from an outer side of the cushion away from the frame, to protect the storage device and the frame from vibration.

4 Claims, 2 Drawing Sheets

MOUNTING APPARATUS FOR STORAGE DEVICE

BACKGROUND

1. Technical Field

The present disclosure relates to a mounting apparatus for a storage device.

2. Description of Related Art

An electronic device, such as a computer, generally includes a frame to fix a storage device, such as a hard disk drive, or a compact disk read-only memory (CD-ROM) drive to a chassis of the electronic device. However, the frame and the storage device are apt to be shaken by vibration, and therefore can lead to unstable connections with various connectors within the device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Figure 1:
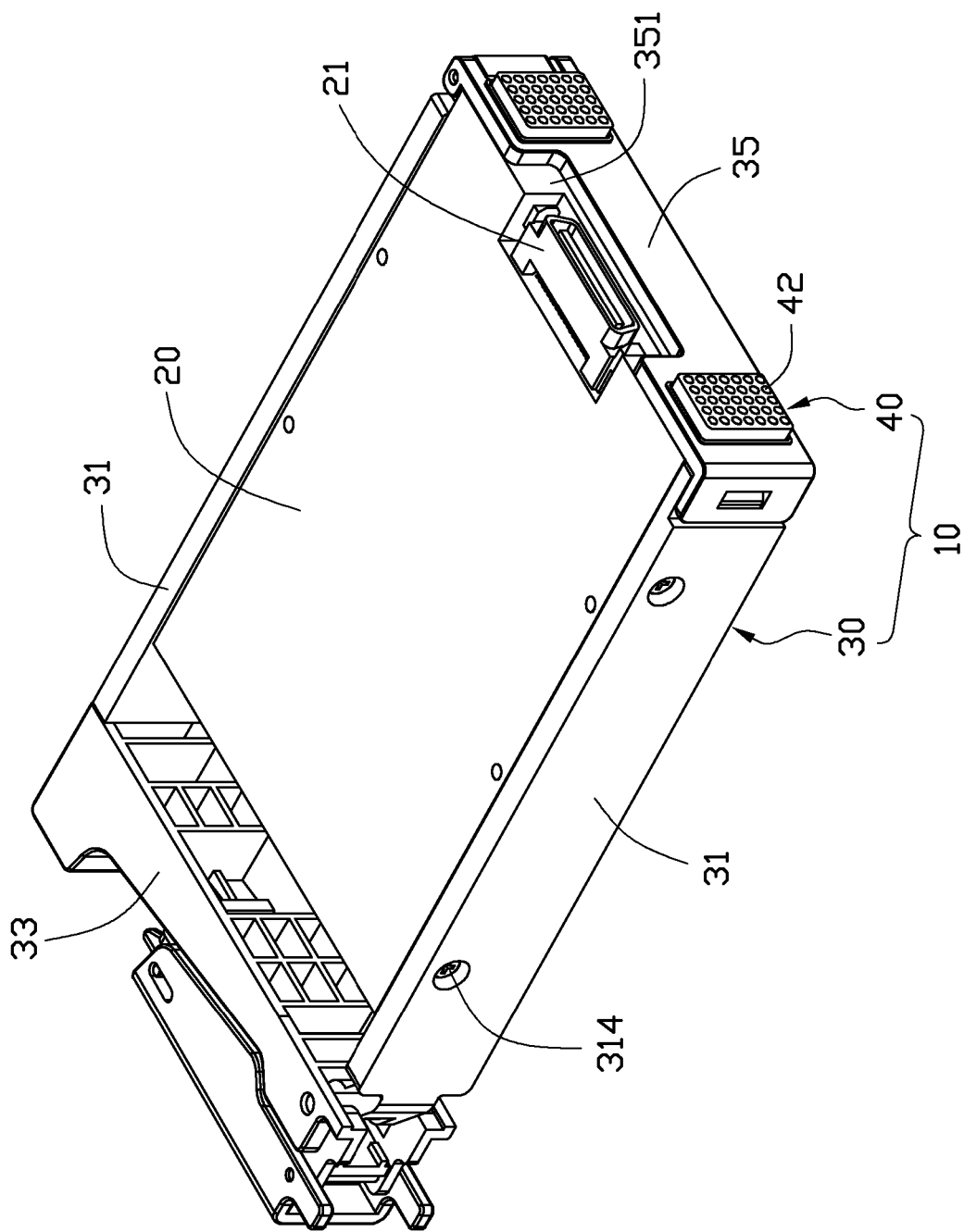
FIG. 1 is an assembled, isometric view of an exemplary embodiment of a mounting apparatus together with a storage device.

Referring to FIG. 1, an exemplary embodiment of a mounting apparatus 10 is provided to fix a storage device 20 with a connector 21 mounted on a rear end of the storage device 20. The mounting apparatus 10 includes a frame 30 and two cushions 40.

The frame 30 includes two opposite side plates 31, a fixing plate 33 perpendicularly connected between front ends of the side plates 31, and a stop plate 35 perpendicularly connected between rear ends of the side plates 31. The storage device 20 is received among the side plates 31, the fixing plate 33, and the stop plate 35, with opposite sides of the storage device 20 being correspondingly fixed to the side plates 31 by a plurality of fasteners. An opening 351 is defined in the stop plate 35, to allow the connector 21 of the storage device 20 to be exposed to outside of the frame 30. In this embodiment, the fasteners are screws 314. In other embodiments, the fasteners may be protrusions or latches extending from inside surfaces of the side plates 31.

The cushions 40 are made of shock absorbing resilient material, such as rubber or cellular urethane foam. The cushions 40 are fixed to an outside surface of the stop plate 35 adjacent to opposite sides of the opening 351 by glue or latches. A plurality of domed protrusions 42 protrudes from an outer side of each cushion 40 away from the stop plate 35.

Figure 2:
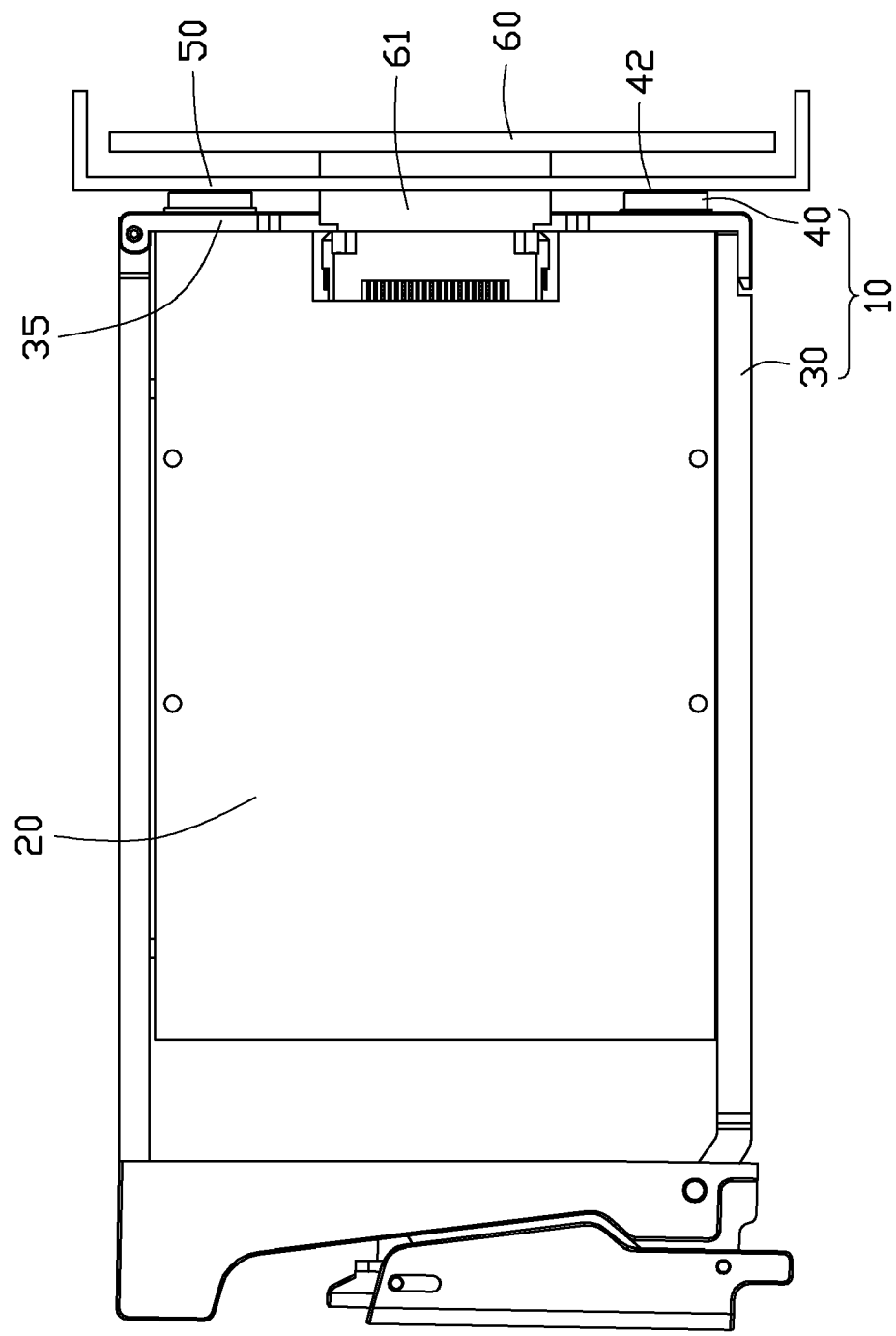
FIG. 2 is a top plan view of the mounting apparatus and the storage device of FIG. 1, together with a mounting plane and a circuit board.

Referring to FIG. 2, when the mounting apparatus 10 and the storage device 20 are installed in a bracket of an electronic device (not shown), the cushions 40 of the mounting apparatus 10 deform and abut against a mounting plane 50 on a rear end of the bracket. A circuit board 60 is arranged at a rear side of the mounting plane 50. The circuit board 60 includes a connector 61 extending through the mounting plane 50 opposite to the storage device 20. The connector 21 of the storage device 20 is electrically connected to the connector 61 of the circuit board 60 through the opening 351. When the electronic device suffers vibration, the cushions 40 absorb shock from the frame 30 to the mounting plane 50 and absorb shock from the mounting plane 50 to the frame 30. The protrusions 42 of the cushions 40 deform to absorb shock parallel to the mounting plane 50 between the frame 30 and the mounting plane 50. Therefore, the cushions 40 can absorb shock from three directions, which protects the frame 30 and the storage device 20, and prevents the connector 21 of the storage device 20 from disconnecting from the connector 61 of the circuit board 60 when the electronic device suffers vibration.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A mounting apparatus for a storage device, the mounting apparatus comprising:

a frame to receive the storage device; and a cushion fixed to a rear end of the frame, a plurality of protrusions extending from an outer side of the cushion away from the frame, wherein the frame comprises two opposite side plates, a fixing plate connected between front ends of the side plates, and a stop plate connected between rear ends of the side plates, the cushion is fixed to an outside surface of the stop plate, an opening is defined in the stop plate, to allow a connector of the storage device to be exposed to outside of the frame.

2. The mounting apparatus of claim 1, wherein the plurality of protrusions is dome-shaped.

3. A mounting apparatus for a storage device, the storage device comprising a connector at a rear end of the storage device, the mounting apparatus comprising:

a frame to receive the storage device, wherein the connector of the storage device is exposed to outside of a rear end of the frame; and two cushions fixed to the rear end of the frame respectively adjacent to opposite sides of the connector, a plurality of protrusions extending from an outer side of each of the cushions away from the frame, wherein the frame comprises two opposite side plates, a fixing plate connected between front ends of the side plates, and a stop plate connected between rear ends of the side plates, the storage device is received among the side plates, the fixing plate, and the stop plate, an opening is defined in the stop plate, to allow the connector of the storage device to be exposed to outside of the frame, the cushions are fixed to an outside surface of the stop plate adjacent to opposite sides of the opening.

4. The mounting apparatus of claim 3, wherein the plurality of protrusions is dome-shaped.

* * * * *